United States Patent
Herrmann et al.

(10) Patent No.: US 8,774,353 B2
(45) Date of Patent: Jul. 8, 2014

(54) RADIATION DETECTOR WITH AN ARRAY OF ELECTRODES

(75) Inventors: Christoph Herrmann, Aachen (DE); Christian Baeumer, Dorsten-Rhade (DE); Roger Steadman Booker, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 339 days.

(21) Appl. No.: 13/127,791

(22) PCT Filed: Nov. 9, 2009

(86) PCT No.: PCT/IB2009/054967
§ 371 (c)(1),
(2), (4) Date: May 5, 2011

(87) PCT Pub. No.: WO2010/055457
PCT Pub. Date: May 20, 2010

(65) Prior Publication Data
US 2011/0211669 A1 Sep. 1, 2011

(30) Foreign Application Priority Data
Nov. 13, 2008 (EP) ..................... 08168981

(51) Int. Cl.
*A61B 6/00* (2006.01)
(52) U.S. Cl.
USPC .......................................... 378/19

(58) Field of Classification Search
USPC ................. 378/19, 98.8; 250/370.08, 370.09, 250/370.11
See application file for complete search history.

(56) References Cited

U.S. PATENT DOCUMENTS

| | | | |
|---|---|---|---|
| 2005/0017189 A1* | 1/2005 | Homma et al. | 250/370.11 |
| 2006/0033029 A1 | 2/2006 | Popper | |
| 2006/0056581 A1 | 3/2006 | Hoffman et al. | |
| 2007/0003006 A1 | 1/2007 | Tkaczyk et al. | |
| 2007/0120062 A1* | 5/2007 | Li et al. | 250/370.09 |
| 2007/0206721 A1 | 9/2007 | Tkaczyk et al. | |
| 2007/0235655 A1 | 10/2007 | Rhiger et al. | |

FOREIGN PATENT DOCUMENTS

WO 2008059425 A2 5/2008

* cited by examiner

*Primary Examiner* — Courtney Thomas (57) ABSTRACT

The invention relates to a radiation detector (100) comprising a converter element (113) with an array (120) of first electrodes (121) for sampling electrical signals generated by incident radiation (X). With a connection circuit (130), at least two first electrodes (121) can selectively be coupled to a common readout unit (141) according to a given connection pattern (CP1). The effective pixel size along the path of incident radiation (X) can thus be adapted to the distribution of electrical signals, which is usually determined by the spectral composition of the incident radiation.

20 Claims, 5 Drawing Sheets

Pixel: 1200um x 285um
En. [20...89]keV, 800mA, IP_s=0.0005, PixNr=1
R0: 4.77128e+007/(s mm2) = 1.63178e+007/(s x 1200um x 285um)

| No. | T[μm] | 1/(s x 1200um x 285um) |     | Cts |
|-----|-------|------------------------|-----|-----|
| 1   | 500   | 1.25871e+007           | CZT | 6.29e+003 |
| 2   | 500   | 2.51956e+006           | CZT | 1.26e+003 |
| 3   | 1000  | 1.02213e+006           | CZT | 511 |
| 4   | 1000  | 151328                 | CZT | 75.7 |

Px: 0.00230868

Pixel: 1200um x 285um
En. [20...89]keV, 800mA, IP_s=0.0005, PixNr=CP
R0: 323367/(s mm2) = 110591/(s x 1200um x 285um)

| No. | T[μm] | 1/(s x 1200um x 285um) |     | Cts |
|-----|-------|------------------------|-----|-----|
| 1   | 500   | 78853.8                | CZT | 39.4 |
| 2   | 500   | 20383.6                | CZT | 10.2 |
| 3   | 1000  | 9401.28                | CZT | 4.7 |
| 4   | 1000  | 1544.19                | CZT | 0.772 |

Pixel: 1200um x 285u
En. [12...149]keV, 800mA, IP_s=0.0002, PixNr=1
R0: 1.6306e+008/(s mm2) = 5.57665e+007/(s x 1200um x 285um)

| No. | T[μm] | 1/(s x 1200um x 285um) |     | Cts      |
|-----|-------|------------------------|-----|----------|
| 1   | 1500  | 4.75223e+007           | CZT | 9.5e+003 |
| 2   | 500   | 2.58718e+006           | CZT | 517      |
| 3   | 500   | 1.6281e+006            | CZT | 326      |
| 4   | 500   | 1.09e+006              | CZT | 218      |

Px: 0.052701

Pixel: 1200um x 285um
En. [12...149]keV, 800mA, IP_s=0.0002, PixNr=CP
R0: 1.72534e+006/(s mm2) = 590065/(s x 1200um x 285um)

| No. | T[μm] | 1/(s x 1200um x 285um) |     | Cts    |
|-----|-------|------------------------|-----|--------|
| 1   | 1500  | 454961                 | CZT | 91     |
| 2   | 500   | 38537.3                | CZT | 7.71   |
| 3   | 500   | 25784.3                | CZT | 5.16   |
| 4   | 500   | 17992.6                | CZT | 3.6    |

RADIATION DETECTOR WITH AN ARRAY OF ELECTRODES

FIELD OF THE INVENTION

The invention relates to a radiation detector comprising a converter element with an array of electrodes on one side. Moreover, it relates to an imaging system comprising such a radiation detector and to a method for detecting radiation with such a radiation detector.

BACKGROUND OF THE INVENTION

The US 2007/03006 A1 discloses an X-ray detector for a Spectral CT (Computed Tomography) scanner in which incident X-ray photons are counted and classified with respect to their energy. The detector comprises a material that absorbs incident X-ray photons and electrodes for the detection of the resulting electrical signals. To cope with high count rates, an array of single anodes is provided to reduce the effective size of the pixels. A problem of this detector is however that its function may become sub-optimal if the operation parameters of the imaging system change.

SUMMARY OF THE INVENTION

Based on this situation it was an object of the present invention to provide detection means that can cope with changing operation parameters of an image generating system.

This object is achieved by a radiation detector according to claim 1, an imaging system according to claim 8, a method according to claim 13, and a computer program according to claim 15. Preferred embodiments are disclosed the dependent claims.

According to its first aspect, the invention relates to a radiation detector for detecting radiation, for example radioactive radiation, sound waves, in particular electromagnetic radiation (e.g. X-rays or γ-rays). The radiation detector comprises at least one unit which will be called "detection slab" and which comprises the following components:

a) A converter element for converting incident radiation into electrical signals. The converter element may be made from any suitable direct conversion material that transforms incident radiation to be detected into electrical signals, particularly into a pulse of electrical charges (e.g. electron-hole pairs in the conduction resp. valence band of the material), or charge pulse.

b) An array of electrodes, which will be called "first electrodes" in the following for purposes of reference, said first electrodes being disposed on one side ("first side") of the converter element for locally sampling electrical signals generated by incident radiation in the converter element. In this context, the expression "locally sampling" shall indicate that a given first electrode primarily collects electrical signals (e.g. electrons from a charge cloud) that are closer to this electrode than to any other of the first electrodes.

c) A connection circuit for selectively coupling at least two first electrodes to a common readout unit or to different readout units according to a given connection pattern. The number M of available readout units will usually be smaller than the number N of first electrodes, so that at least two first electrodes will always have to be coupled to a common readout unit if no signals shall be lost. If there are enough readout units (i.e. M=N), one possible connection pattern may however comprise that each first electrode is coupled to a different readout unit.

The described radiation detector has the advantage that first electrodes of the array on the converter element can be coupled together as desired to constitute larger pixel volumes that are processed by one single readout unit. A limited number of readout channels can thus be assigned to the first electrodes in a flexible and optimally adjusted way. As the count rates at different positions in the converter element will usually vary with the spectral composition of the incident radiation, the selection of the connection pattern in the connection circuit can be used to adapt the assignment of readout units optimally to the characteristics of the incident radiation, e.g. the maximum photon energy as defined by the tube voltage.

In general, the spatial distribution of first electrodes in the array on the converter element may be arbitrary. Preferably, the array of first electrodes comprises however a plurality of first electrodes that are arranged in line one behind the other, wherein the set of all these electrodes is subdivided into geometrically connected subsets with the electrodes of each subset being connected to a common readout unit. The considered line of first electrodes is thus composed of more or less short sections of consecutive first electrodes, with each of these sections being coupled to another common readout unit. When the considered line of first electrodes is oriented parallel to the radiation direction during the operation of the detector, the incident radiation will travel along the line of first electrodes. In case of X-radiation, the photons will usually generate a distribution of charge pulses (in terms of pulse size and inter-arrival times of the different pulses generated due to interaction) along their path that depends characteristically on the spectral composition of the radiation; the subdivision of the line of first electrodes into sections of connected electrodes can therefore be optimally adapted to the expected distribution of the electrical signals, especially the inter-arrival times between different pulses, which determines the count rate resulting in such a section.

The first electrodes on the first side of the converter element may have different sizes, particularly different extensions in the direction of radiation incidence, wherein said extension can be designed according to the expected distribution of pulses of electrical signal charge in the converter element. In a radiation detector according to the present invention, the first electrodes can however also have substantially equal sizes, because an adaptation to the signal distribution can also and more flexibly be achieved by an appropriate connection pattern of the first electrodes.

The connection circuit is preferably realized in an interconnect layer that is disposed adjacent to the first side of the converter element. This has the advantage that the electrical coupling of first electrodes takes place as close as possible to these electrodes, thus avoiding a loss or a deterioration of electrical signals (e.g. by a higher capacitive load seen by the connected readout electronics) along their pathway.

While the radiation detector may comprise just one single detection slab with the described features, it is preferred that a plurality of such detection slabs is present, wherein the slabs are disposed next to each other in a one- or a two-dimensional arrangement. Thus large detector areas can be constructed from substantially identical building blocks.

When the connection circuit changes between two connection patterns of the first electrodes, currents may flow due to a charging or discharging of capacitances constituted by the electrodes and the converter element. In order to prevent possible damages from these currents, it is preferred that the connection circuit is adapted to limit any possible disconnection of the first electrodes from definite potentials during a change of connection patterns to at most a given maximal switching time (e.g. to less than 100 µs). If the states of disconnection are short enough, currents cannot reach a harmful magnitude. Preferably, intermediate states of disconnection are completely avoided by appropriate switching mechanisms.

The invention further relates to an imaging system for generating images, particularly an X-ray system, most particularly a Spectral CT scanner. The imaging system comprises:

A radiation source for emitting radiation into a region of interest.

A radiation detector of the kind described above for detecting emitted radiation, wherein said detection typically takes place after some interaction of the emitted radiation with the region or object that shall be imaged. X-radiation may for example be detected after a transmission through the body of a patient. As defined above, the radiation detector comprises at least one detection slab with a converter element having an array of first electrodes on a first side and with a connection circuit for electrically coupling at least two first electrodes to a common readout unit according to a given connection pattern.

The imaging system provides the advantages that are discussed above with respect to the radiation detector. In particular, the sensitivity of this detector can optimally be adapted to the spectral composition of the radiation emitted by the radiation source.

According to a preferred embodiment of the invention, the imaging system comprises a control unit that is coupled to the radiation detector and that is adapted to set the connection pattern in the connection circuit of the radiation detector according to operation parameters of the radiation source. Preferably the control unit is additionally coupled to the radiation source to set or at least read-out its current operation parameters. The operation parameters of the radiation source will usually determine characteristics of the generated radiation, such that the connection pattern can optimally be adapted to the radiation. The tube voltage in a conventional X-ray source determines for example the spectral composition of the resulting X-radiation (the higher the tube voltage, the higher the maximum energy of the generated X-ray photons), which in turn implies the spatial distribution of electrical signals generated in the converter element of the radiation detector: The higher the photon energy the higher the chance is that the photon interacts in a lower layer with the conversion material and generates charges.

In a further development of the aforementioned embodiment, the connection patterns are such that, in regions of the converter element that are first hit and passed by radiation emitted by the radiation source, a large number N1 of first electrodes is coupled to a common readout unit if said radiation has a high energy E1, while a comparatively smaller number N2<N1 of first electrodes is coupled to said common readout unit if said radiation has a comparatively lower energy E2<E1.

In this context, the "large" number N1 of first electrodes is defined with respect to the "smaller" number N2 (i.e. N1=2 may be a "large number" with respect to N2=1), and the "high" energy E1 is defined with respect to the lower energy E2. Moreover, "the energy of a radiation" shall refer to the spectral composition of said radiation; it may for example be defined as the average energy of all photons that constitute the spectrum of the radiation.

In a closely related embodiment of the invention, the connection patterns are such that, in regions of the converter element that are last reached and passed by radiation emitted by the radiation source, a small number N1 of first electrodes is coupled to a common readout unit if said radiation has a high energy E1, while a comparatively higher number N2>N1 of first electrodes is coupled to said common readout unit if said radiation has a comparatively lower energy E2<E1.

The described dependencies of the connection pattern on the spectral composition of the radiation take into account that X-ray photons with higher energy will usually penetrate deeper into the converter element than photons of lower energy. In case of high energy spectra, more first electrodes can therefore be coupled together at the top of the converter element than at the bottom of the converter element.

The invention further relates to a method for detecting radiation, particularly X-radiation, comprising the following steps:

a) Converting incident radiation into electrical signals in a converter element, for example into charge pulses.

b) Sampling said electrical signals by an array of first electrodes disposed on a first side of the converter element.

c) Selectively coupling at least two first electrodes to a common readout unit or to different readout units according to a given connection pattern.

The method comprises in general form the steps that can be executed with a radiation detector of the kind described above. Therefore, reference is made to the preceding description for more information on the details, advantages and improvements of that method.

The described method will typically be realized with the help of a computing device, e.g. a microprocessor, a readout circuit, or an FPGA in the radiation detector or imaging system. Accordingly, the present invention further includes a computer program product which provides the functionality of any of the methods according to the present invention when executed on a computing device.

Further, the present invention includes a data carrier, for example a floppy disk, a hard disk, an EPROM, or a compact disc (CD-ROM), which stores the computer product in a machine readable form and which executes at least one of the methods of the invention when the program stored on the data carrier is executed on a computing device. The data carrier may particularly be suited for storing the program of the computing device mentioned in the previous paragraph.

Nowadays, such software is often offered on the Internet or a company Intranet for download, hence the present invention also includes transmitting the computer product according to the present invention over a local or wide area network.

BRIEF DESCRIPTION OF THE DRAWINGS

These and other aspects of the invention will be apparent from and elucidated with reference to the embodiment(s) described hereinafter. These embodiments will be described by way of example with the help of the accompanying drawings in which.

DESCRIPTION OF PREFERRED EMBODIMENTS

Like reference numbers in the Figures refer to identical or similar components.

Figure 1:
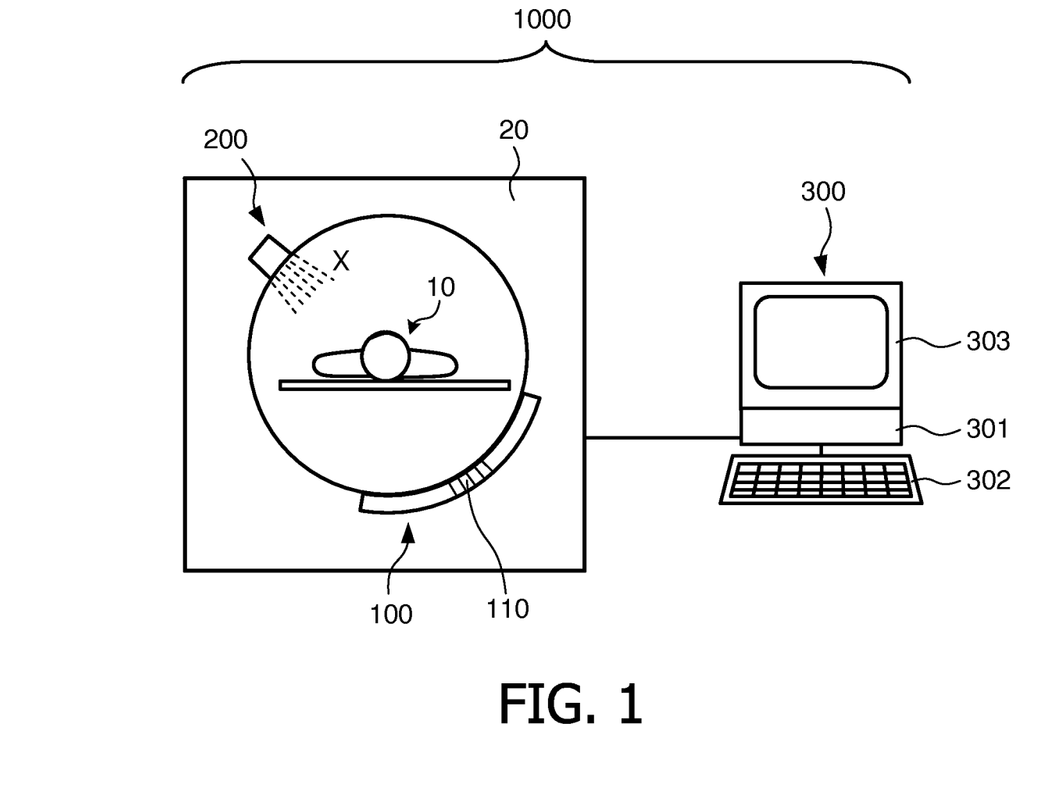
FIG. 1 schematically illustrates a CT system as an example of an imaging system according to the present invention.

The following description will refer to the example of a Spectral CT scanner 1000 as it is schematically shown in FIG. 1, though the present invention is not limited to this application. The Spectral CT scanner 1000 comprises a gantry 20 in which an X-ray source 200 and an X-ray detector 100 are mounted opposite to each other such that they can rotate around a patient 10 lying on a table in the middle of the gantry. The detector 100 and the radiation source 200 are connected to a control unit 300, for example a workstation 301 with input means (keyboard 302) and output means (monitor 303).

Spectral CT has a high potential to improve computed tomography as spectral information contained in the polychromatic X-ray beam generated by an X-ray tube and passing a scanned object is used to provide new and diagnostically critical information. The enabling technology for Spectral CT imaging systems is a detector, which can provide a sufficiently accurate estimate of the flux and the energy spectrum of the photons hitting the detector behind the scanned object. Since for image reconstruction reasons the detector is also exposed to the direct beam, the photon count rates in a detector pixel seeing the direct beam are huge (approximately $10^9$ photons per $mm^2$ and second, i.e. 1000 Mcps). In conventional hardware, a detector pixel will be saturated at a count rate of about 10 Mcps.

An approach to deal with these high counting rates is to sub-structure the sensor (i.e. convertor) part of the detector, in which an X-ray photon interacts and generates a charge pulse, which is further evaluated by the readout electronics. Two-dimensional sub structuring into small sub-pixels (e.g. 300 µm×300 µm) lying next to each other in a plane perpendicular to the beam direction can be considered as well as a three-dimensional sub-structuring into several different sensor layers stacked in beam direction. In this approach, each sub-pixel in a sensor layer has its own energy-resolving readout electronics channel with sub-channels for each energy.

A possible detector architecture may be based on "edge-on" detector slabs (i.e. slabs put on an edge, facing the incident radiation with a small side), where an array of anode electrodes on each slab forms detector layers such that the count rates in each layer are further reduced. At high incident rates, at which the count rate exceeds the acceptable rate (saturated layers), an adaptive pre-processing scheme can be used that ignores the measurement data of saturated sub-pixels.

For obtaining a strong small-pixel effect, or in other words a good weighting potential, it is important to use slabs that are relatively thick (e.g. at least 1 to 1.2 mm) compared to the anode electrode size. However, if it shall be made sure that sufficient detector layers are not yet in saturation, it turns out that the required layer thicknesses for high tube voltages (140 kVp and more) are different from the required thicknesses for lower tube voltages (90 kVp). Different tube voltages are used for different medical imaging applications (thorax, pelvis, head) in practice, due to the different attenuation of the different body areas.

Hence a multi-layer detector based on a multi-slab approach is proposed here in which the pixilated anodes on the slabs form N layers e.g. of the same thickness (corresponding to anodes of the same size), which by suitable electric switches in the readout electronics can be combined into M<N electrically relevant layers. Due to the electric switches, the detector can be configured whether to be used with a high or a low tube voltage. The effective pixel size along the path of incident radiation can thus be adapted to the distribution of electrical signals, which is usually determined by the spectral composition of the incident radiation.

Figure 2:
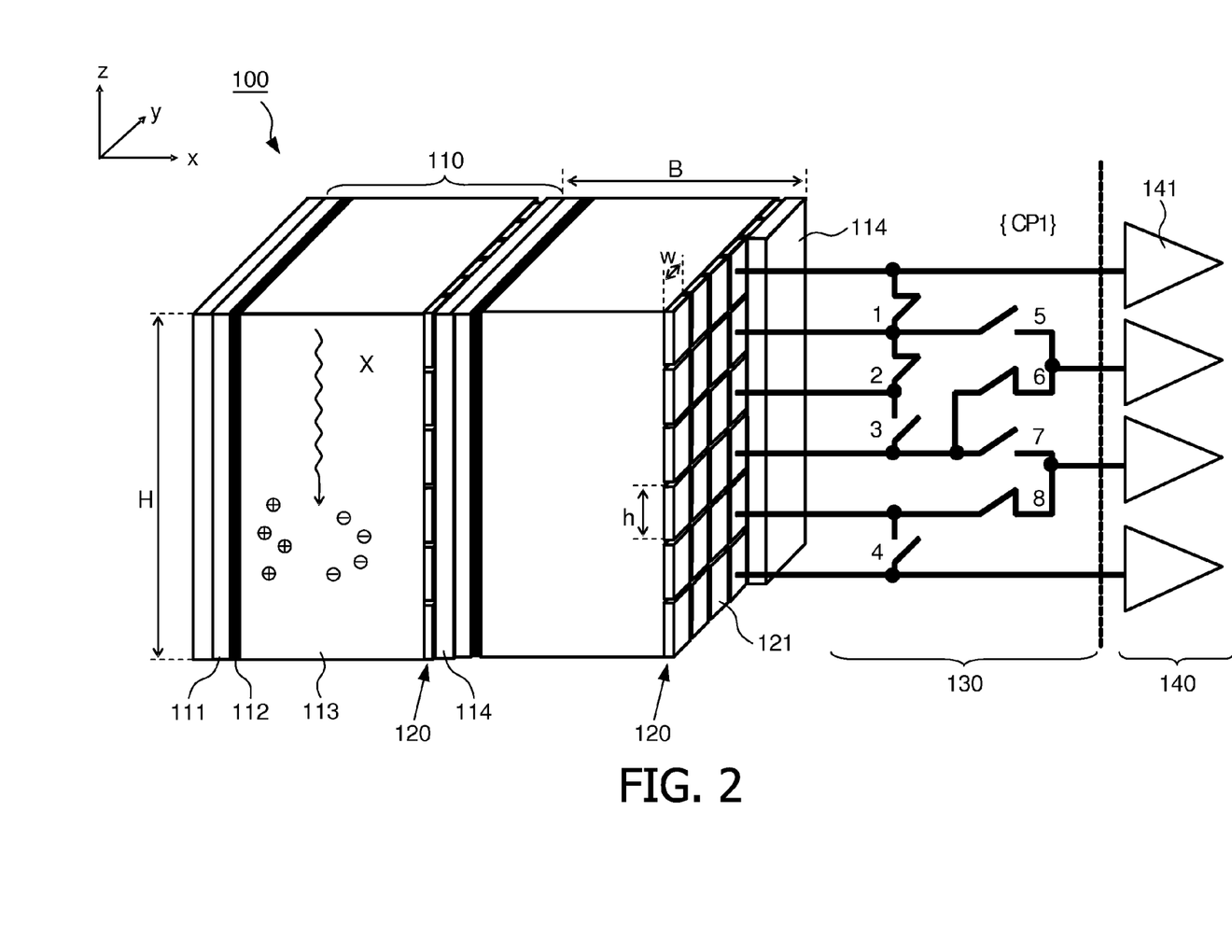
FIG. 2 shows schematically two slabs of a radiation detector according to the present invention with a first connection pattern of the anodes.

FIG. 2 illustrates schematically two detector slabs 110 of a radiation detector 100 that is designed according to the aforementioned concepts. Each slab 110 consists of the following components:

- A converter element 113, for example a plate of Si, Ge, GaAs, HgI, CZT (cadmium zinc telluride), and/or CdTe, in which incident X-rays are converted into electrical charges in the conducting band.
- An array 120 of first electrodes 121 disposed on a first side of the converter element 113. These first electrodes 121 will in the following be called "anodes" because they are usually operated at a positive electrical potential. In the shown embodiment, six anodes are disposed in line in the direction of radiation incidence (negative z-direction), establishing six "basic" detector layers on the edge-on slab.
- An interconnect layer 114 that connects the anodes 121 to circuits for signal readout and processing (not shown). The interconnect layer 114 may optionally comprise some signal processing circuitry. On the right hand side of the Figure, the interconnect layer 114 is only partially shown to make the anodes 121 visible. Moreover, the internal circuitry of the interconnect layer 114 is illustrated for one column of anodes. Each detector column usually has the same switching matrix.
- A second electrode 112, operated as a cathode, that completely covers the opposite second side of the converter element 113.
- An isolating layer 111 for electrically isolating the cathode 112 from the interconnect layer of the adjacent detector slab.

The detector slabs 110 have a height H in the direction of radiation incidence (negative z-direction) of about 3 mm and a thickness B (in the x-direction that corresponds to the direction of the electrical field inside the converter element) between about 0.7 mm and 1.5 mm.

Each single anode 121 on the first side of the converter element collect charges (electrons) that have been lifted into the conducting band by an incident X-ray photon X and that are in the reach of the electrical field emanating from said anode. To limit the number of electrical pulses that have to be counted, the anode 121 has a small size with a height h (z-direction) of typically about 500 µm and a width (y-direction) of typically about 285 µm.

FIG. 2 shows a situation in which X-radiation with a comparatively high energy is used, for example generated by an X-ray tube 200 operated at about 150 kVp. The high energy of the photons X implies that most of the electrical signal is generated near the bottom of the converter element 113, so that the top anodes have to deal only with small counting rates. For this reason, a connection circuit 130 is provided in the interconnect layer 114 which connects anodes 121 at the top of the converter element 113 according to a first connection pattern CP1. In particular, the top three anodes 121 in a vertical column of anodes constitute a subgroup of anodes that are coupled to a common readout unit 141 in associated readout electronics 140. A possible setting of switches 1 to 8 for generating such a connection pattern CP1 is schematically indicated on the right hand side. In this configuration switches 1, 2, 6 and 8 are closed, the remaining ones are kept open. The connection pattern CP1 results in effective layer thicknesses of 1500 µm, 500 µm, 500 µm, and 500 µm ("inverted thicknesses").

Figure 3:
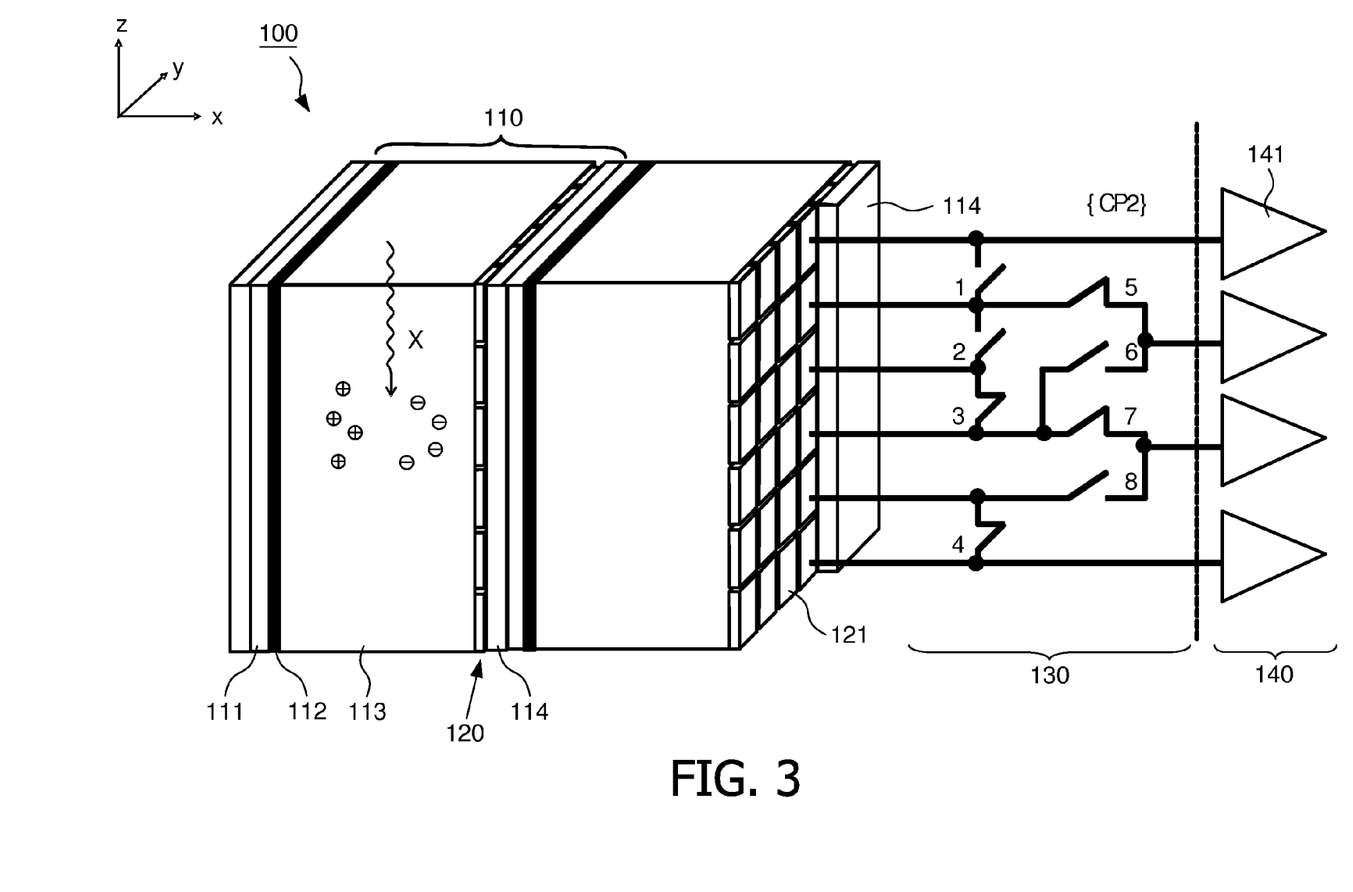
FIG. 3 shows the slabs of the radiation detector with a second connection pattern of the anodes.

FIG. 3 shows the same two converter slabs 110 when X-radiation of a lower energy shall be detected, for example generated by an X-ray tube 200 operated at 90 kVp. In this case, most of the electrical signal is generated in the top part of the converter element 113, while the central and the lower part will only have to deal with lower counting rates. The radiation detector 100 of the present invention can be adapted to this situation by switching the connection circuit 130 to a new connection pattern CP2 of the anodes 121. In this new connection pattern CP2, the two neighboring anodes 121 in the middle and at the bottom, respectively, are coupled to a common readout unit 141 each. The connection pattern CP2 results in effective layer thicknesses of 500 µm, 500 µm, 1000 µm, and 1000 µm.

A possible setting of the switches in the connection circuit 130 is shown on the right hand side of FIG. 3 and comprises that (only) switches 3, 4, 5 and 7 are closed. It should be noted that only one control signal is necessary as all switches can be acted on simultaneously. All switches shown can be implemented within the interconnect layer 114 as a readout ASIC.

It should be noted that the switching from one connection pattern to any other requires (similar to a power-up condition) that some precautions need to be taken. This is because a direct converter is typically biased to a certain potential (e.g. −1000 V or somewhat lower for the thicknesses considered above). At power-up it is needed to ensure that all anodes are connected to a defined potential before applying the bias voltage. Reversed operation would give the chance that the sensor element charges (equivalent to a capacitor) to the bias potential. Sudden connection to any other potential through switching would then generate a spike of a voltage peak approximately to the difference of potentials. If the readout circuits are not properly protected this could cause extensive damage. Similarly, during switching among different connection patterns, the same situation may occur if there is a time interval when anodes are disconnected (i.e. on a floating potential) for example because all switches are open (non-overlapping switching).

A first option to avoid the aforementioned problems is to ensure a fast switching interval to minimize the effect. The sensor elements will charge (or discharge) to a rate given by their capacitance and the material resistance. The switching therefore has to be significantly faster than the time constant of those elements.

As a second option, an overlapping switching scheme can be implemented. In the examples described above, this could be realized if the switching contains a phase in which all switches are closed.

Figure 4:
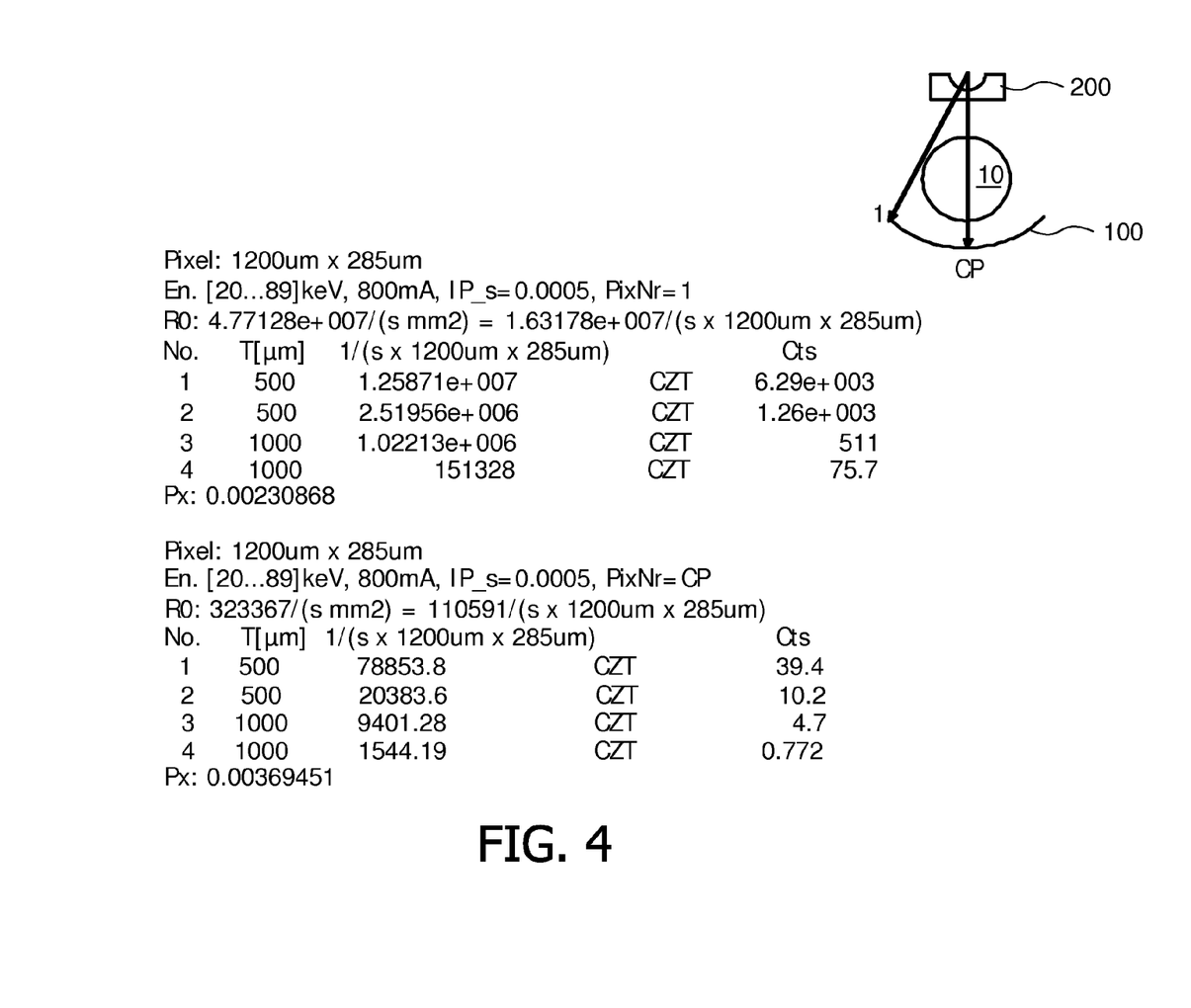
FIGS. 4 and 5 show simulation results of count rates for different connection patterns.
Figure 5:
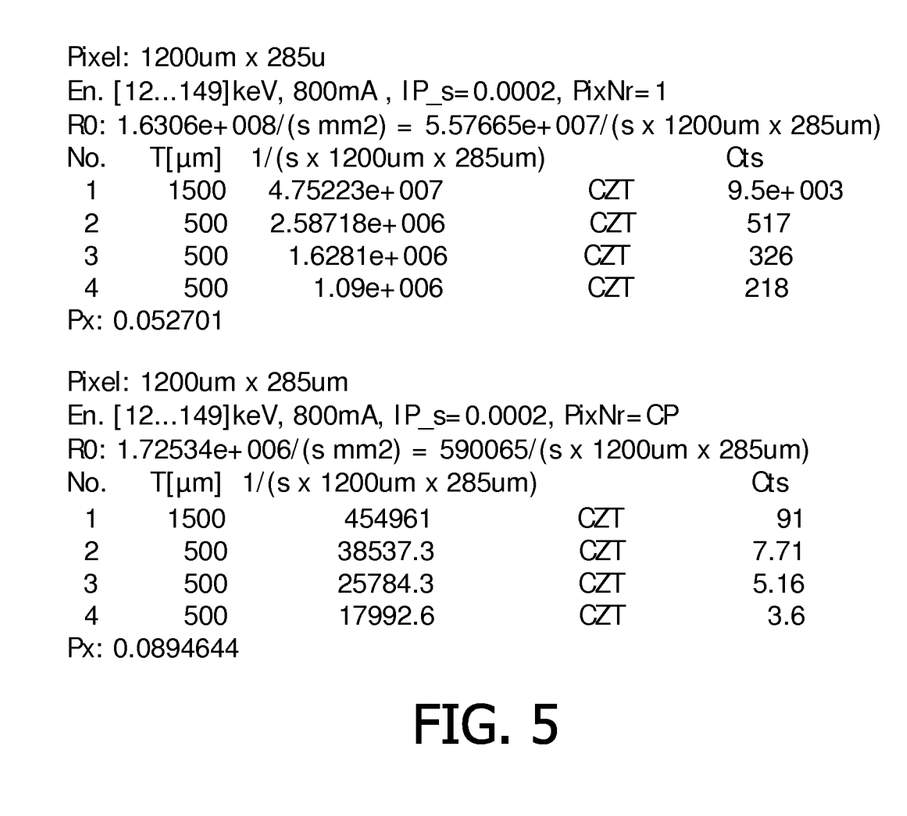

FIGS. 4 and 5 show tables with simulation results of count rates (third column) and counts ("Cts", fifth column) in an imaging system of the kind described above with CTZ as converter material. The numbering of pixels is indicated in the additional sketch of FIG. 4, i.e. the pixel with PixNr=1 is at the periphery of the detector 100 and in the direct beam, while the pixel with PixNr=CP is in the center of the detector 100 and maximally shielded by the test object 10 (corresponding to 35 cm H$_2$O filtering). Pixel sizes, energies ("En.") of the photons, operation parameters of the tube 200, and the rate R0 in front of the detector are given in the headlines of the tables. The four layers (each coupled to a separate readout unit) formed by the applied connection pattern are numbered 1, 2, 3, and 4, and their thicknesses T are given in column 2 of the tables. All simulations were made with beam shapers, and the portion of photons not absorbed is indicated by Px.

FIG. 4 shows the resulting count rates for a detector pixel in the direct beam and in the detector center for a tube current of 800 mA and tube voltage of 90 kVp. The grouping into M=4 electrically relevant layers with thicknesses T of 500 µm, 500 µm, 1000 µm, 1000 µm results in only the top layer being saturated, since the count rate is above 10 Mcps.

FIG. 5 shows the corresponding results for a tube current of 800 mA and tube voltage of 150 kVp. The grouping into M=4 electrically relevant detector layers with thicknesses T of 1500 µm, 500 µm, 500 µm, 500 µm results in only the top layer being saturated, since the count rate is above 10 Mcps.

If a higher granularity is needed, anodes of e.g. 300 µm×285 µm could be implemented establishing ten "basic" detector layers on the edge-on slab. Then grouping by closing the relevant switches would give e.g.

for 90 kVp: layer thicknesses of 300 µm, 300 µm, 600 µm, 1800 µm for 150 kVp: layer thicknesses of 900 µm, 300 µm, 300 µm, 1500 µm, such that in the direct beam only the top layer is saturated. The actual grouping can be adjusted as desired by selecting the correct switches.

Of course other topologies for the connection circuit than the shown ones may be considered, too. A connection circuit with a switching matrix can also be designed for arbitrary configuration (i.e. for all combinations of physically implemented layers and readout channels to be connected to), also for different numbers of readout channels and pixels.

Important applications of the invention are Computed Tomography with energy resolution, projection imaging with energy resolution, or any other application that may benefit from energy-resolving X-ray photon counting.

Finally it is pointed out that in the present application the term "comprising" does not exclude other elements or steps, that "a" or "an" does not exclude a plurality, and that a single processor or other unit may fulfill the functions of several means. The invention resides in each and every novel characteristic feature and each and every combination of characteristic features. Moreover, reference signs in the claims shall not be construed as limiting their scope.

The invention claimed is:
1. A radiation detector comprising:
  at least one detection slab, including:
    a converter element for converting incident radiation into electrical signals;
    an array of first electrodes disposed on a first side of the converter element for locally sampling said electrical signals; and
    a connection circuit for selectively coupling at least two first electrodes to a common readout unit or to different readout units according to a given connection pattern.
2. The radiation detector according to claim 1, wherein the array of first electrodes comprises a plurality of first electrodes which are arranged in line, and that geometrically connected subsets of these first electrodes are each connected to common readout units.
3. The radiation detector according to claim 1, wherein the first electrodes have substantially equal sizes.
4. The radiation detector according to claim 1, wherein the connection circuit is realized in an interconnect layer disposed adjacent to the first side of the converter element.
5. The radiation detector according to claim 1, further comprising: at least one second electrode disposed on a second side of the converter element.

6. The radiation detector according to claim 1, characterized in that it comprises a plurality of detection slabs disposed next to each other in a one or two-dimensional arrangement.

7. The radiation detector according to claim 1, wherein the connection circuit is adapted to limit a possible disconnection of the first electrodes during a change of connection patterns to less than a given maximal switching time.

8. An X-ray system, comprising:
a radiation source that emits x-ray radiation; and
a radiation detector according to claim 1, wherein the incident radiation is the emitted x-ray radiation and the converter element converts the incident emitted x-ray radiation into electrical signals.

9. The imaging system according to claim 8, further comprising:
a control unit coupled to the radiation detector for setting the connection pattern in the connection circuit in dependence on operation parameters of the radiation source.

10. The imaging system according to claim 8,
wherein in regions of the converter element that are first passed by radiation emitted by the radiation source,
a large number of first electrodes is coupled to a common readout unit if said radiation has a first energy,
while a smaller number of first electrodes is coupled to said common readout unit if said radiation has a second energy, which is lower than the first energy.

11. The imaging system according to claim 8,
wherein in regions of the converter element that are last passed by radiation emitted by the radiation source,
a small number of first electrodes is coupled to a common readout unit if said radiation has a first energy,
while a larger number of first electrodes is coupled to said common readout unit if said radiation has a second energy, which is lower than the first energy.

12. The imaging system according to claim 8, wherein the radiation source is an X-ray source.

13. A method for detecting radiation comprising:
converting incident radiation with a converter element into electrical signals;
sampling said electrical signals with an array of first electrodes disposed on a first side of the converter element; and
selectively coupling at least two first electrodes to a common readout unit or to different readout units according to a given connection pattern.

14. The method according to claim 13, wherein the electrical signal comprises the generation of electrical charges.

15. A computer program product for enabling carrying out a method according to claim 13.

16. The method according to claim 13, further comprising:
limiting a possible disconnection of the first electrodes during a change of connection patterns to less than a given maximal switching time.

17. The method according to claim 13, wherein the converter element has a depth and the incident radiation traverses along the depth, and further comprising:
coupling a first sub-set of the first electrodes to a first common readout unit and a second sub-set of the first electrodes to a second common readout unit, where the first set of electrodes are disposed at a first end of the converter element that is at a first distance from the incident radiation and the second set of electrodes are disposed at a second end of the converter element that is at a second distance from the incident radiation, wherein the first distance is less than the second distance.

18. The method according to claim 17, wherein a first number of first electrodes in the first sub-set is greater than a second number of the first electrodes in the second sub-set in response to the incident radiation including first radiation with first energy.

19. The method according to claim 18, wherein the first number of first electrodes in the first sub-set is less than the second number of the first electrodes in the second sub-set in response to the incident radiation including second radiation with second energy, wherein the second energy is greater than the first energy.

20. The method according to claim 13, wherein the incident radiation is x-ray radiation.

* * * * *